US007275702B2

(12) United States Patent
Nolte et al.

(10) Patent No.: US 7,275,702 B2
(45) Date of Patent: Oct. 2, 2007

(54) VALVE UNIT FOR AN ELECTROSTATIC COATING INSTALLATION

(75) Inventors: Hans J. Nolte, Stuttgart (DE); Harry Krumma, Bonningheim (DE); Frank Herre, Oberriexingen (DE); Michael Baumann, Weinbergsteige (DE); Stefano Giuliano, Gerlingen (DE); Seigfied Poppe, Unterriexingen (DE)

(73) Assignee: Durr Systems, Inc., Plymouth, MI (US)

( * ) Notice: Subject to any disclaimer, the term of this patent is extended or adjusted under 35 U.S.C. 154(b) by 1021 days.

(21) Appl. No.: 10/360,775

(22) Filed: Mar. 27, 2002

(65) Prior Publication Data

US 2006/0169937 A1 Aug. 3, 2006

(30) Foreign Application Priority Data

Mar. 29, 2001 (DE) ................................ 101 15 472

(51) Int. Cl.
*B05B 5/00* (2006.01)
*F23D 11/32* (2006.01)
*F16K 31/02* (2006.01)

(52) U.S. Cl. ........................ 239/700; 385/18; 137/554; 251/129.04; 118/325

(58) Field of Classification Search ........... 251/129.04; 137/554; 385/18; 118/325; 239/700
See application file for complete search history.

(56) References Cited

U.S. PATENT DOCUMENTS 4,356,397 A * 10/1982 Lenderking et al. ... 250/231.13
4,376,135 A 3/1983 Patel et al. .................... 427/31
4,521,462 A 6/1985 Smythe ...................... 427/421
4,572,437 A 2/1986 Huber et al. ................ 239/703
4,589,597 A 5/1986 Robisch et al. ............. 239/703
4,684,064 A 8/1987 Kwok ........................ 239/223
4,715,314 A 12/1987 Ramseier et al. ........... 118/631
4,852,810 A 8/1989 Behr et al. .................. 239/703
4,901,751 A * 2/1990 Story et al. ................ 137/312
4,919,333 A 4/1990 Weinstein ................... 239/223
4,927,081 A 5/1990 Kwok et al. ................ 239/223
4,944,459 A 7/1990 Watanabe et al. ........... 239/305
4,955,960 A 9/1990 Behr et al. ...................... 239/3
5,011,086 A 4/1991 Sonnleitner et al. ........ 239/691
5,076,321 A * 12/1991 Terry .......................... 137/460
5,078,321 A 1/1992 Davis et al. ................ 239/224
5,127,125 A 7/1992 Skibowski ............. 15/104.061
5,294,217 A 3/1994 Talacko et al. ............... 406/91
5,300,006 A 4/1994 Tanaka et al. ................ 483/56
5,397,063 A 3/1995 Weinstein ................... 239/703
5,622,563 A 4/1997 Howe et al. ................ 118/620
5,633,306 A 5/1997 Howe et al. ................ 524/409
5,662,278 A 9/1997 Howe et al. ................ 239/700
5,683,032 A 11/1997 Braslaw et al. ................ 239/7

(Continued)

FOREIGN PATENT DOCUMENTS

DE 41 05 116 A 1 8/1992

(Continued)

*Primary Examiner*—Eric Keasel
*Assistant Examiner*—John K. Fristoe, Jr.
(74) *Attorney, Agent, or Firm*—Howard & Howard Attorneys, P.C.

(57) ABSTRACT

The main needle valve of an electrostatic atomizer has an opto-electronic sensor device with optical waveguides whose faces are opposite a reflecting element of a component moveable with the valve needle for potential-free switch position interrogations.

18 Claims, 2 Drawing Sheets

U.S. PATENT DOCUMENTS

| | | | | |
|---|---|---|---|---|
| 5,704,977 | A | 1/1998 | Baumann et al. | 118/323 |
| 5,865,380 | A | 2/1999 | Kazama et al. | 239/704 |
| 6,037,010 | A | 3/2000 | Kahmann et al. | 427/421 |
| 6,090,450 | A | 7/2000 | Kahmann et al. | 427/421 |
| 6,508,610 | B2 | 1/2003 | Dietrich | 406/13 |
| 6,589,348 | B2 | 7/2003 | Ott | 118/684 |

FOREIGN PATENT DOCUMENTS

| | | |
|---|---|---|
| DE | 43 42 128 A1 | 6/1995 |
| DE | 196 10 588 A 1 | 9/1997 |
| DE | 197 09 988 A 1 | 10/1998 |
| DE | 197 42 588 A 1 | 4/1999 |
| DE | 198 30 029 A 1 | 1/2000 |
| DE | 199 09 369 A 1 | 9/2000 |
| DE | 199 37 425 A 1 | 3/2001 |
| DE | 100 33 986 A 1 | 1/2002 |
| DE | 100 63 324 C 1 | 7/2002 |
| DE | 101 30 173 A 1 | 1/2003 |
| EP | 0 767 005 A1 | 4/1997 |
| EP | 0 904 848 A1 | 3/1999 |
| EP | 0 967 016 A1 | 12/1999 |
| EP | 1 108 475 A2 | 6/2001 |
| EP | 1 114 677 A1 | 7/2001 |
| EP | 1 172 152 A1 | 1/2002 |
| WO | WO94/22589 | 10/1994 |

* cited by examiner

VALVE UNIT FOR AN ELECTROSTATIC COATING INSTALLATION

FIELD OF THE INVENTION

The invention concerns a valve unit according to the preamble of claim 1, especially for an atomizer under high voltage during operation for series coating of vehicle bodies, for example.

BACKGROUND OF THE INVENTION

In known electrostatic rotary or air atomizers of this type (DE 4306800 A and Durr/Behr "EcoGun ESTA"), the paint line at the input to the atomization device is opened and closed with a paint needle valve, the so-called main needle valve, whose valve needle is pulled from the closed position against the force of a restoring spring into the open position by the piston of a pneumatic valve drive under control by the higher level program control system of the coating installation.

Feedback of at least one and preferably both switch positions of the main or paint needle valve is desirable for the higher level installation control. For example, in non-electrostatic air atomizers it was possible and common to generate the desired switch position signals with Hall sensors or inductive sensors mounted on the valve drive. These electric sensors, however, cannot be used in electrostatic atomizers that are under high voltage during operation. Although a switch position interrogation would also be important here, no practicable possibility has thus far been available for this.

Recording of the switch position of a valve needle for control of paint flow occurs, on the one hand, to monitor the switching function by feedback and, on the other hand, for valve control. By recording the time between the control signal of a valve needle and feedback of the switch position change in comparison with a stipulated reference value, deviations related to the operation (for example, by component wear) can be recognized and compensated in terms of process control. Because of this, especially in painting robots that operate with high painting speeds and frequent engagement/disengagement of valve needles, better constancy of the processes is possible.

There are also pneumatic sensors for interrogation of the switch position of valves, which, however, are too slow for the dynamic processes considered here.

The underlying task of the invention is therefore to provide a valve unit whose switch position even under high voltage can be interrogated as free of delay as possible.

SUMMARY OF THE INVENTION

This task is solved by the features of the patent claims.

With the invention, a potential-free and therefore switch position signaling also appropriate for electrostatic atomizers is made possible, for example, for main needle interrogation. The switch position of other valves situated in an electrostatic atomizer or in other components of a coating installation under high voltage can also be interrogated in the manner described here. The valve can also be a diaphragm valve.

BRIEF DESCRIPTION OF THE DRAWINGS

The invention is further explained in the electrostatic rotary atomizer for direct charging of coating material shown in the drawing as an embodiment example. In the drawing.

DETAILED DESCRIPTION OF THE PREFERRED EMBODIMENT

Figure 1:
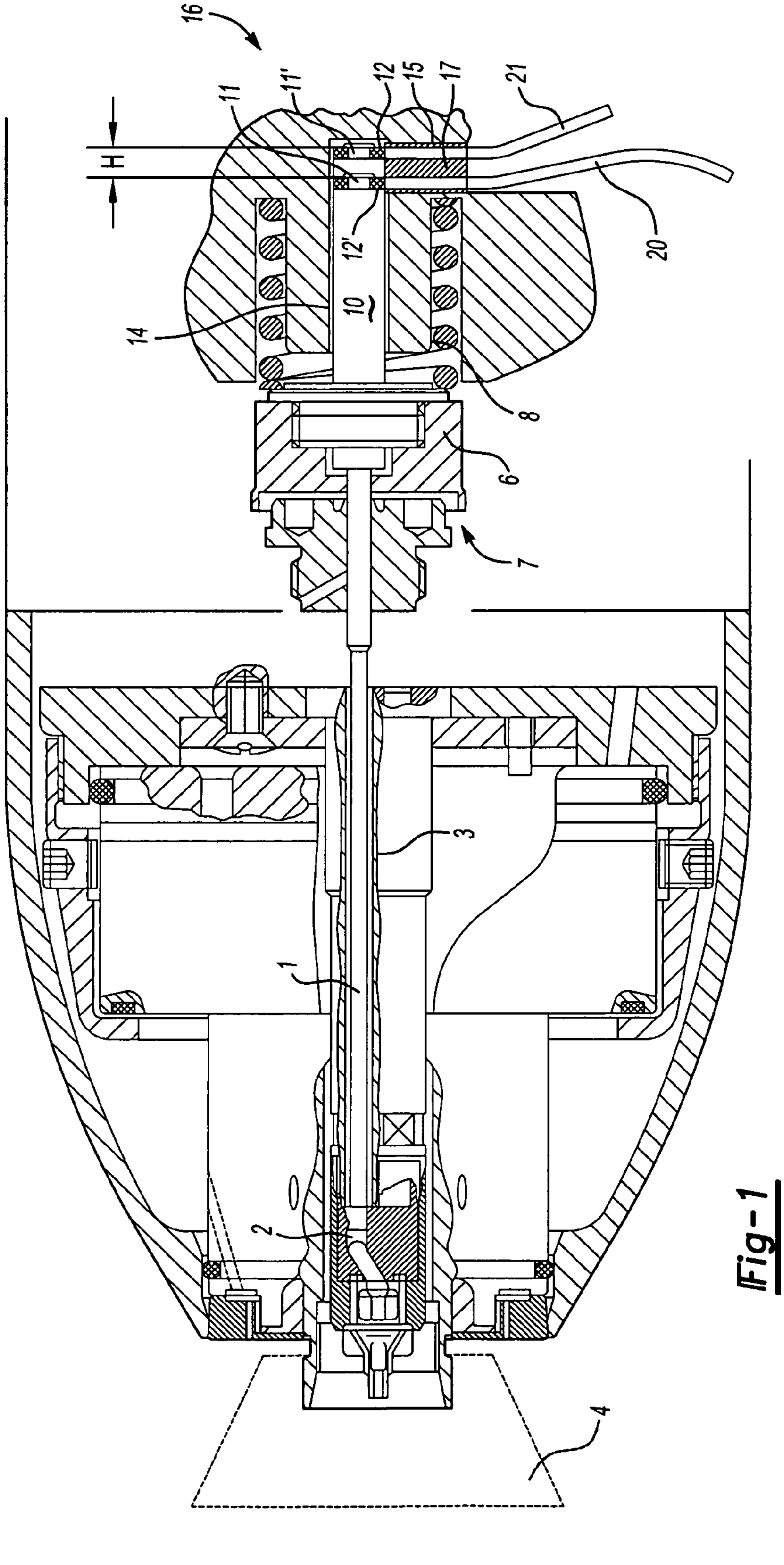
FIG. 1 shows the rotary atomizer with the valve unit.

The atomizer depicted in FIG. 1 has the usual main needle valve with valve needle 1 for opening and closing of the paint channel 2 that discharges into the atomizer bell 4. The valve needle is moveable along its axis in the coaxial paint tube 3 containing paint channel 2. A pneumatic valve drive with a piston 6 is provided for valve operation, which piston is acted upon by compressed air for opening of the main needle valve at 7 and as a result of this pulls the valve needle 1 fastened to it against the force of a compression spring 8 engaging on its back sides rightward in the drawing in the direction facing away from the atomizer bell 4. The atomizer is known per se to this extent. The entire paint guide system of the atomizer can lie at a high voltage potential during operation on the order of, say, 100 kV.

A tappet or shaft element 10 that can be arranged coaxial with the valve needle 1, for example, within compression spring 8, is mounted on the piston 6 on its back side facing away from valve needle 1. The shaft element 10 according to the depiction expediently has on the periphery of its end part 11 facing away from piston 6 an optically reflecting surface element 12. The reflecting surface of element 12 can be flat and extend around the entire periphery, for example, of the square end part of the shaft (in cross section).

The end part 11 provided with the reflecting element 12 is shown in the drawing in the two switch positions of the main needle valve. They can be seen at 11, 12 in the (left) closed position, and in the valve open position at 11', 12'(right). The needle lift H between these two switch positions can be about 5 mm.

The shaft 10 is moveable in a recess 14 of the valve housing coaxial to the needle axis, into which a radially running opening 15 leads, i.e., transverse to the needle axis through the housing.

A sensor device 16 includes a retaining or positioning element 17 for two optical waveguide units or sensors 20 and 21 that fit in opening 15, the optical faces of which are aligned with the inside wall of recess 14 at both sites at which the reflecting element 12, 12' is situated in the two switch positions.

The reflecting element therefore lies right against the face of optical waveguide unit 20 when the main needle valve is closed and opposite the face of unit 21 when the valve is opened. The mutual spacing of the center axes of units 20, 21 corresponds to the valve needle lift H. As a result, the two switch positions can be reported by light signals that are formed when light is fed from the outside through the corresponding optical waveguide unit, reflected by the element 11, 11' and fed back through the same optical waveguide unit (or possibly another optical waveguide) to an optoelectronic sensor (not shown), which can be situated outside of the high voltage region.

Optical waveguide sensor systems appropriate for the described purpose are known per se and need no further description.

Instead of the depicted arrangement of the reflecting surface element 12 on various or all peripheral parts on the end of the shaft element 10, which permits arbitrary rotational positions of the shaft with reference to the optical waveguide 20, 21, one reflecting surface only on the peripheral part facing the optical waveguide is sufficient. The switch position interrogation can also occur on other sites of the valve needle itself or a component moveable with it.

In some instances, a single optical waveguide unit can also be sufficient for interrogation of only one of the two switch positions.

Instead of the radial arrangement of the optical waveguide in the depicted practical example, it is also possible to arrange an optical waveguide axially along the shaft element, whose switch position is recognized by differently intense reflection.

Figure 2:
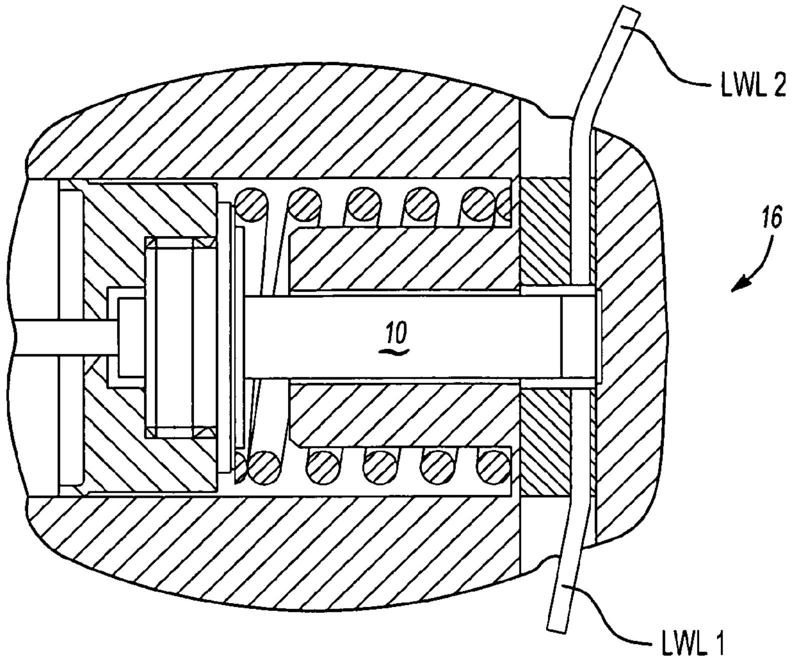
FIG. 2 and FIG. 3 show two modified embodiments.

Another possibility of modification is arrangement of at least one opto-electronic light barrier, for example, on the shaft element 10 for potential-free interrogation of one or both switch positions. FIG. 2 shows an embodiment with two optical waveguides LWL1 and LWL2 arranged aligned with each other radially on opposite sides of the shaft element. In the depicted switch position, the waveguide LWL2 can guide light pulses sent from waveguide LWL1 to the optical electronic transducer, whereas in the other position of the shaft element end, the light barrier closes. In the embodiment according to FIG. 3, on the other hand, both switch positions can be actively interrogated, since here a hole 30 leading through the shaft element radially and positioned between two aligned optical waveguides LWL1, LWL2 and LWL1', LWL2' is present. According to another possibility (not shown), the main needle valve shown in the drawing can be modified so that at least one magnetically active sensor element is arranged on or in the moveable shaft element 10, for example, instead of the reflecting element 12 in FIG. 1 or the hole 30 in FIG. 3. In this modification at least one sensor element that exploits the magneto-optic Faraday effect or Kerr effect and that contains an optical polarization device with an analyzer serves as sensor device for interrogation of the switch position arranged on the moveable shaft element. The transmitter element can be a permanent magnet or also an element made of iron or another material with ferromagnetic properties with which the magnetic field of a magnetic element contained in the sensor element is variable. By approach of the transmitter element moving with the shaft element 10, the polarization direction of the light guided by the polarization device can be rotated in the sensor element to generate a light signal. An optical waveguide arrangement connected to the polarization device leads to a remote electronic device situated outside of the high voltage region to generate an electrical signal corresponding to the light signal. The sensor element can contain a reflector that guides the light coming from the polarization device back to the analyzer in which a refraction element (Faraday effect element) or a prism is situated between the polarization device and the reflector and a light guide for the light fed to the sensor element and the light guide for the light fed to the remote electronic device are connected to the polarization device. Such optical sensors are known per se and are commercially available. In the case described here, however, they have a special and surprising advantage in that they can operate without problem under high voltage. Depending on the expediency, one or two sensors, for example, can be arranged on the sites of the optical waveguides 20 and/or 21 in FIG. 1.

Figure 3:
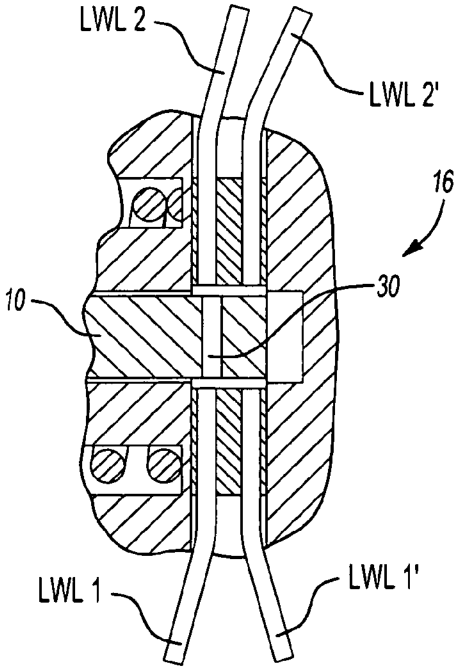
Figure 4:
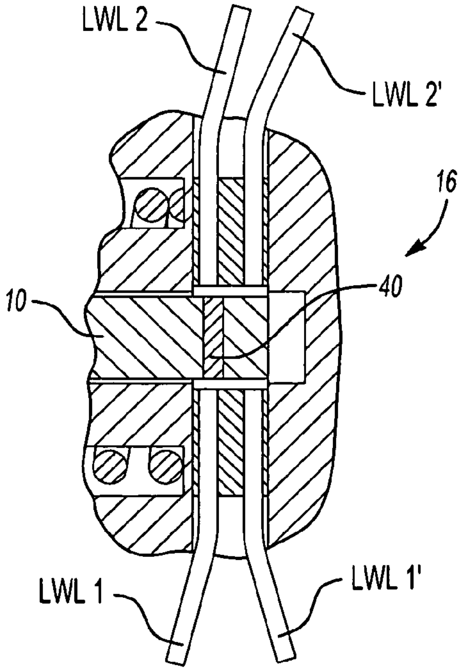
FIG. 4 shows another embodiment of the present invention.

Especially when only one optical waveguide unit is arranged on the moveable shaft element 10 and the second optical waveguide 21 in FIG. 1 or the second unit with the optical waveguides LWL1', LWL2' in FIG. 3 are to be avoided, it can be expected that two signal generation elements spaced from each other in the direction of movement be provided on the moveable shaft element 10, the first element of which triggers a binary signal of the sensor device, when the valve needle 1 is situated in one switch position, whereas the second signal generation element triggers a binary signal of the sensor device when the valve needle 1 is in its other switch position. According to FIGS. 1 and 3, the two signal generation elements can be formed by reflecting surfaces, between which a nonreflecting or slightly reflecting surface is situated, or through spaced light barrier openings. An embodiment with two permanent magnets or magnetically active transmitting elements at a spacing in shaft element 10 is also possible for the aforementioned Faraday effect or Kerr effect.

The binary signals triggered by the sensor in the two switch positions expediently have the same binary value. The binary signals are generated by the electronic sensor device, which is situated at a site removed from the valve outside of the high voltage region and is connected to the valve unit via the optical waveguide arrangement. When the shaft element 10 is displaced between its two positions, the sensor signal changes because of the region lying between the two signal generation elements initially into the opposite binary value before the first binary value is again generated on reaching the other valve position. By means of an electronic control device, it can be established whether, for example, after generation of a control signal for switching of the valve (and after disappearance of the first binary value), the first binary value is generated again as notification of the other valve position within a stipulated time. If this is not the case, a disturbance is present that is reported by an alarm signal.

The invention claimed is:

1. A rotary atomizer having a valve unit for an electrostatic installation for series coating of workpieces comprising;

a housing extending to an atomizer bell for coating the workpieces, a paint tube disposed in said housing and fluidly communicating with said atomizer bell for delivering the paint to said atomizer bell for coating the workpieces, a remote-controlled switchable valve disposed in said housing and being cooperable with said paint tube and a valve element wherein said valve element is moveable between a first switch position wherein said valve releases a path of a medium flowing through said valve and a second switch position wherein said valve is closed, an opto-electronic sensor device with at least one optical waveguide sensing movement of said valve element between at least two of said switch positions, a magnetically active transmitter element arranged on said moveable component with said sensor device includes an optical polarization device, that by approaching said magnetically active transmitter polarizes the light guided through said polarization device wherein the light is varied in said sensor device in a magneto-optically way to generate a light signal, whereby an optical waveguide arrangement of said sensor device is connected to said polarization device, which leads to a remote electronic device to generate an electric signal corresponding to said light signal, and wherein said sensor device contains a reflector that guides the light coming from said polarization device and being analyzed by said polarization device, in which a refraction element that rotates the direction of polarization is situated between said polarization device and said reflector and that a light guide for the light fed to the sensor device and said light guide for the light fed to said remote electronic device are connected to said polarization device.

2. The rotary atomizer according to claim 1, where said moveable component has at least one optically reflecting surface opposite a sensor surface of said optical waveguide when said valve element is situated in the switch position to be reported.

3. The rotary atomizer according to claim 1, wherein said moveable valve element is the valve needle of a needle valve.

4. The rotary atomizer according to claim 3, wherein said moveable component is a shaft element mounted coaxial to valve needle on a piston of a pneumatic valve drive, said shaft element being moveable in a recess of a valve housing into which a radial opening with respect to an axis of said valve needle leads for said optical waveguide.

5. The rotary atomizer according to claim 1, wherein said moveable component includes two signal generation elements spaced from each other in the direction of displacement, said first element of which triggers a binary signal of said sensor device when the valve element is situated in one switch position, whereas said second signal generation element triggers the binary signal of said sensor device with the valve element situated in its other switch position.

6. The rotary atomizer according to claim 5, wherein said two signal generation elements of said moveable component are formed from optically reflecting surfaces.

7. The rotary atomizer according to claim 5, wherein said two signal generation elements are formed by light barrier openings.

8. The rotary atomizer according to claim 5, wherein said two binary signals have the same binary value and that said sensor signal of the sensor device is switched to the opposite binary value when said moveable component is shifted between its two positions.

9. The rotary atomizer according to claim 5, comprising an electronic control device with which it is established that the binary signal appears within a stipulated time after generation of the control signal for switching of said valve and that otherwise an alarm signal is generated.

10. A valve unit for an electrostatic installation for series coating of workpieces comprising:

a remote-controlled switchable valve having a valve element moveable between two switch positions such as when said valve element is in one of said switch positions a path for a medium is released through said valve and another of said switch positions wherein said valve is closed Thereby interrogating said switch positions of said valve and for generating a corresponding interrogation signal;

an opto-electronic sensor device with at least one optical waveguide for sensing movement of said valve element between at least two switch positions;

a magnetically active transmitter element arranged on said moveable valve element;

said sensor device having an optical polarization device that approaches said transmitter as said moveable valve element is moved relative said sensor device thereby polarizing the light guided through said polarization device whereby said sensor device is adaptable to magneto-optically generate a light signal, whereby an optical waveguide arrangement is connected to said polarization device, which leads to a remote electronic device thereby generating an electric signal corresponding to said light signal; and a reflector of said sensor device adaptable for guiding the light coming from said polarization device and analyzing the light wherein a refraction element rotatable in the direction of polarization is situated between said polarization device and said reflector thereby guiding the light fed to the sensor device and further to said remote electronic device connected to said polarization device.

11. A valve unit according to claim 10, where said moveable valve element has at least one optically reflecting surface opposite a sensor surface of said optical waveguide when said valve element is situated in the switch position to be reported.

12. A valve unit according to claim 10, wherein said moveable valve clement includes a valve needle and a needle valve.

13. A valve unit according to claim 10, wherein said moveable valve clement includes a shaft mounted coaxial to the valve needle on a piston of a pneumatic valve drive, said shalt being moveable in a recess of a valve housing, into which a radial opening with respect to an axis of said valve needle leads for said optical waveguide.

14. A valve unit according to claim 10, wherein said moveable valve element includes two signal generation elements spaced from each other in the direction of displacement, said first element of which triggers a binary signal of said sensor device when the valve element is situated in one switch position, whereas said second signal generation element triggers the binary signal of said sensor device with the valve element situated in its other switch position.

15. A valve unit according to claim 10, wherein said two signal generation elements of said moveable component are formed from optically reflecting surfaces.

16. A valve unit according to claim 10, wherein said two signal generation elements are formed by light barrier openings.

17. A valve unit according to claim 10, wherein said two binary signals have the same binary value and tat said sensor signal of the sensor device is switched to the opposite binary value when said moveable component is shifted between its two positions.

18. A valve unit according to claim 10, comprising an electronic control device with which it is established tat the binary signal appears within a stipulated time after generation of the control signal for switching of said valve and that otherwise an alarm signal is generated.

* * * * *

UNITED STATES PATENT AND TRADEMARK OFFICE

CERTIFICATE OF CORRECTION

PATENT NO. : 7,275,702 B2
APPLICATION NO. : 10/360775
DATED : October 2, 2007
INVENTOR(S) : Hans J. Nolte et al.

It is certified that error appears in the above-identified patent and that said Letters Patent is hereby corrected as shown below:

Column 5, line 24, in the inventor's section, please delete "Weinbergsteige" and replace with --Flein--.

Column 5, line 58, please insert a --,-- between the words "housing" and "into."

Column 6, line 33, please delete "shalt" and replace it with --shaft--.

Column 6, line 52, please delete "tat" and replace with --that--.

Column 6, line 58, delete "tat" and replace with --that--.

Signed and Sealed this

Twenty-ninth Day of April, 2008

Jon W. Dudas

JON W. DUDAS
*Director of the United States Patent and Trademark Office*